US008887125B1

(12) United States Patent
Nolan et al.

(10) Patent No.: US 8,887,125 B1
(45) Date of Patent: Nov. 11, 2014

(54) SYSTEMS AND METHODS FOR DYNAMIC ARTEFACT SUBSTITUTION (75) Inventors: Ronnie Nolan, Dublin (IE); Andrew Stallard, Middlesex (GB)

(73) Assignee: Misys Ireland Limited, Dublin (IE)

( * ) Notice: Subject to any disclaimer, the term of this patent is extended or adjusted under 35 U.S.C. 154(b) by 876 days.

(21) Appl. No.: 13/089,894

(22) Filed: Apr. 19, 2011

(51) Int. Cl.
G06F 9/44 (2006.01)

(52) U.S. Cl.
USPC .......................... 717/104; 717/107; 717/109

(58) Field of Classification Search
USPC .................................. 717/104–109
See application file for complete search history.

(56) References Cited

U.S. PATENT DOCUMENTS

| | | | | |
|---|---|---|---|---|
| 6,269,473 B1 * | 7/2001 | Freed et al. | ................ | 717/104 |
| 6,341,369 B1 * | 1/2002 | Degenaro et al. | ............ | 717/117 |
| 7,020,869 B2 * | 3/2006 | Abrari et al. | ................ | 717/108 |
| 7,076,766 B2 * | 7/2006 | Wirts et al. | ................ | 717/121 |
| 7,191,429 B2 * | 3/2007 | Brassard et al. | ............ | 717/104 |
| 7,272,817 B1 * | 9/2007 | Hinkle et al. | ................ | 717/104 |
| 7,293,254 B2 * | 11/2007 | Bloesch et al. | ............. | 717/108 |
| 7,467,371 B1 * | 12/2008 | Meredith et al. | ............ | 717/104 |
| 7,493,593 B2 * | 2/2009 | Koehler | .................... | 717/106 |
| 7,533,365 B1 * | 5/2009 | Hogstrom et al. | ........... | 717/105 |
| 7,565,642 B2 * | 7/2009 | Moore et al. | ................ | 717/117 |
| 7,631,291 B2 * | 12/2009 | Shukla et al. | ............... | 717/107 |
| 7,681,176 B2 * | 3/2010 | Wills et al. | ................... | 717/109 |
| 7,693,731 B1 * | 4/2010 | Weber et al. | ..................... | 705/4 |
| 7,735,062 B2 * | 6/2010 | de Seabra e Melo et al. | | 717/120 |
| 7,979,840 B2 * | 7/2011 | Zhang et al. | ................. | 717/104 |
| 8,006,222 B2 * | 8/2011 | Ruhe | ............................ | 717/101 |
| 8,024,703 B2 * | 9/2011 | Gerken et al. | ............... | 717/109 |
| 8,042,092 B2 * | 10/2011 | Koehler et al. | ............. | 717/106 |
| 8,051,404 B2 * | 11/2011 | McGovern et al. | .......... | 717/109 |
| 8,769,481 B2 * | 7/2014 | Chen | ............................ | 717/102 |

OTHER PUBLICATIONS

Spanoudakis, "Plausible and Adaptive Requirement Traceability Structures" ACM, pp. 135-142, 2007.*
Martino et al, "Automatic Recognition of Design Patterns from UML-based Software Documentation", ACM, pp. 1-10, 2013.*
Jaafar, "On the Analysis of Evolution of Software Artefacts and Programs" IEEE, pp. 1563-1566, 2012.*
Delotte et al, "Task Modelling for Capillary Collaborative Systems based on Scenarios", ACM, pp. 25-31, 2004.*

* cited by examiner

*Primary Examiner* — Anil Khatri
(74) *Attorney, Agent, or Firm* — Sheppard Mullin Richter & Hampton LLP (57) ABSTRACT

Methods, machine-readable media, apparatuses and systems are provided to provide an application platform that provides the ability to build applications comprising a set of artifacts. The platform provides the ability to dynamically discover, load and execute the various artifact instances that comprise a an application according to a variable set of contextual parameters, without the context being coded into the application model during its design and development phase. This means that arbitrarily small or large parts of an application may vary in execution according to the run-time context.

20 Claims, 10 Drawing Sheets

SYSTEMS AND METHODS FOR DYNAMIC ARTEFACT SUBSTITUTION

BACKGROUND

1. Field

At least some embodiments of the disclosure relate generally to the field of building applications using multiple component parts that can be dynamically substituted depending on the context of the application at run-time.

2. Description of the Related Art

In large applications that address a wide range of organizations, geographical regions and functionality, there is a challenge of cost of maintenance and operation where specific solutions need to be built for each of these entities because the applications force complexities to be explicitly handled at design time. If complexities can be resolved at run-time, then complexity is lowered in the design time environment, thus reducing cost, and flexibility is introduced to the operational environment, again reducing cost.

BRIEF DESCRIPTION OF THE DRAWINGS

These and other features, aspects, and advantages will become better understood with regard to the following description, appended claims, and accompanying drawings where:

DETAILED DESCRIPTION

The following description and drawings are illustrative and are not to be construed as limiting. Numerous specific details are described to provide a thorough understanding of the disclosure. However, in certain instances, well known or conventional details are not described in order to avoid obscuring the description. References to one or an embodiment in the present disclosure can be, but not necessarily are, references to the same embodiment, and such references mean at least one.

Reference in this specification to "one embodiment" or "an embodiment" or "some embodiments" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments, but not other embodiments.

Features of embodiments that are herein expressly or impliedly described as one of methods, machine-readable media, apparatuses, or systems should be understood to also describe the other of methods, machine-readable media, apparatuses, or systems. For example, embodiments describing features of an apparatus or system should be understood to also describe a method involving the features and a machine-readable media involving the features.

For the purposes of this disclosure, the term "server", in one embodiment, should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software that support the services provided by the server.

For the purposes of this disclosure, computer-readable media stores computer data, which data can include computer program code that is executable by a computer, in machine-readable form. By way of example and not limitation, computer-readable medium may comprise non-transitory, computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium, which can be used to tangibly store the desired information or data or instructions and, which can be accessed by a computer or processor.

For the purposes of this disclosure, an engine is a software, hardware, or firmware (or combinations thereof) system, process or functionality, or component thereof, that performs or facilitates the processes, features, and/or functions described herein (with or without human interaction or augmentation). An engine can include sub-engines. Software components of an engine may be stored on computer-readable media. Engines may be integral to one or more servers, or be loaded and executed by one or more servers.

For the purposes of this disclosure, the term "artefacts" should be understood to refer to components that can be used to build one or more computer applications such as, for example, banking applications. In an embodiment, artefacts have an independent existence apart from applications that utilize them and can be utilized in multiple applications. In one embodiment, in an executing application, artefacts are dynamically selected and loaded using a run-time context of the application. The run-time context of the application can include any variable that defines the circumstances under which the application is being used, such as, for example, the date, time and location from which the application is being used.

In one embodiment, artefacts can take one of two general forms: logical and physical artefacts. Physical artefacts are executable application components. Logical artefacts can be regarded as aliases or names for groups of physical artefacts that perform the same logical function in an application. For example, a group of versions of an "Open Customer Account" artefact could exist, where each of the different versions of the artefact are customized for a specific locale. In one embodiment, each artefact includes contextual parameters that define the run-time context in which the artefact is executed (e.g., a parameter for locale).

Figure 1:
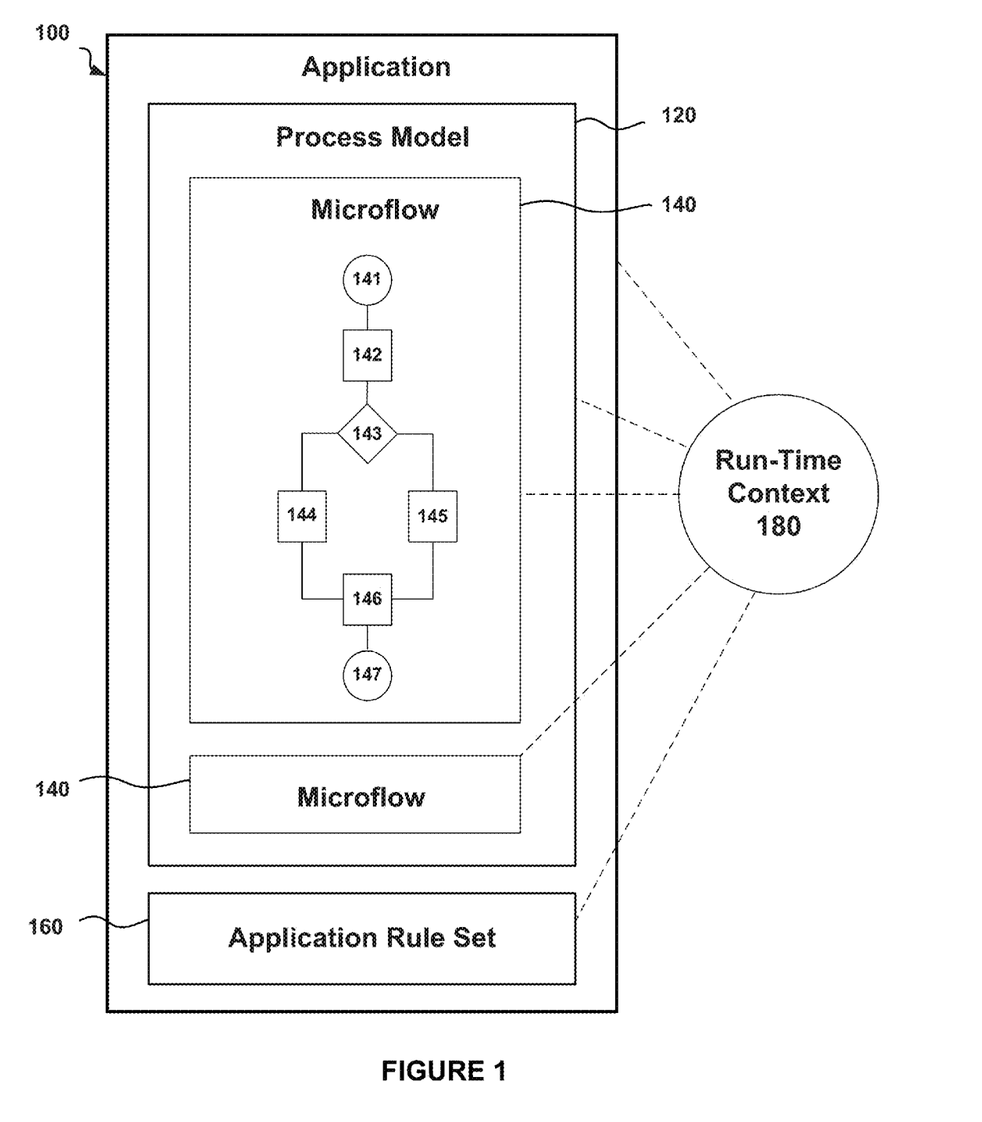
FIG. 1 illustrates a high-level conceptual view of one embodiment of how artefacts can be used to build an application.

FIG. 1 illustrates a high-level conceptual view of one embodiment of how artefacts can be used to build an application 100, for example, one or more functions within a banking system such as an "Open Customer Account" function.

In one embodiment, the application 100 comprises a process model 120 and an application rule set 160. The process model 120 defines the logical artefacts used in an application and their logical relationship with one another. The process model 120 can be regarded as a directed network of executable, logical artefacts. "Directed network" is intended to mean the artefacts are chained together in a particular sequence and that the sequence therein will be executed. At the highest level, the process model 120 is composed of one or more microflows 140.

Microflows 140, which are themselves artefacts, describe the logic flow expected in specific business scenarios. In one embodiment, there are three types of microflows: process flows, screen flows and service flow: process flows control the operations of the business; screen flows control the interaction of users with the application; service flow describes discrete business functionality.

In one embodiment, each microflow 140 includes a beginning 141 and an ending 147 point. Between the beginning 141 and an ending 147 point are one or more activity steps 142 and 144-146. Activity steps 142 and 144-146 describe specific activities (e.g., user input and processing) required in a given business scenario. In one embodiment, each activity step 142 and 144-146 can utilize any other type of artefact (described in detail below) to perform the processing requirements of the application. In one embodiment, each activity step 142 and 144-146 can comprise other activity steps to form a microflow and can be reused across any number of microflow instances.

Within a microflow 140, business rules 143 can be used to control the execution of activity steps 144-146 within the microflow. Business rules 143 define rules that can vary the direction of flow based on specific business data, as well as calculate new business data based on data already existing during the course of execution of a flow. In one embodiment, business rules 143 can be reusable across any number of microflow instances 140.

In one embodiment, the application comprises one or more application rule sets 160. Application rule sets 160 define rules as to how the process model and microflows 140 should be executed. Among other things, the application rule set 160 defines rules that influence what versions of microflows 140 and artefacts the microflows utilize are executed, as will be explained in more detail below.

In one embodiment, the application 100 is executed using a run-time context 180. The process model 120 is built using logical artefacts. The run-time context 180 is used to select a specific application rule set 160 that is appropriate to the run-time context 180. The run-time context 180 and the previously specifically selected application rule set 160 are then together used to select the physical artefacts corresponding to logical artefacts in the process model 120 that are appropriate to the run-time context 180 and selected application rule set 160.

The application structure described above enables applications where artefacts are dynamically substituted based on the run-time context 180. The application structure described above thus enables run-time applications the ability to dynamically discover, load and execute various artefact instances that comprise an application according to contextual parameters, without the context being coded into the application model during its design and development phase. This means that a small or large part of an application may vary its execution according to the context it finds itself in.

Figure 2:
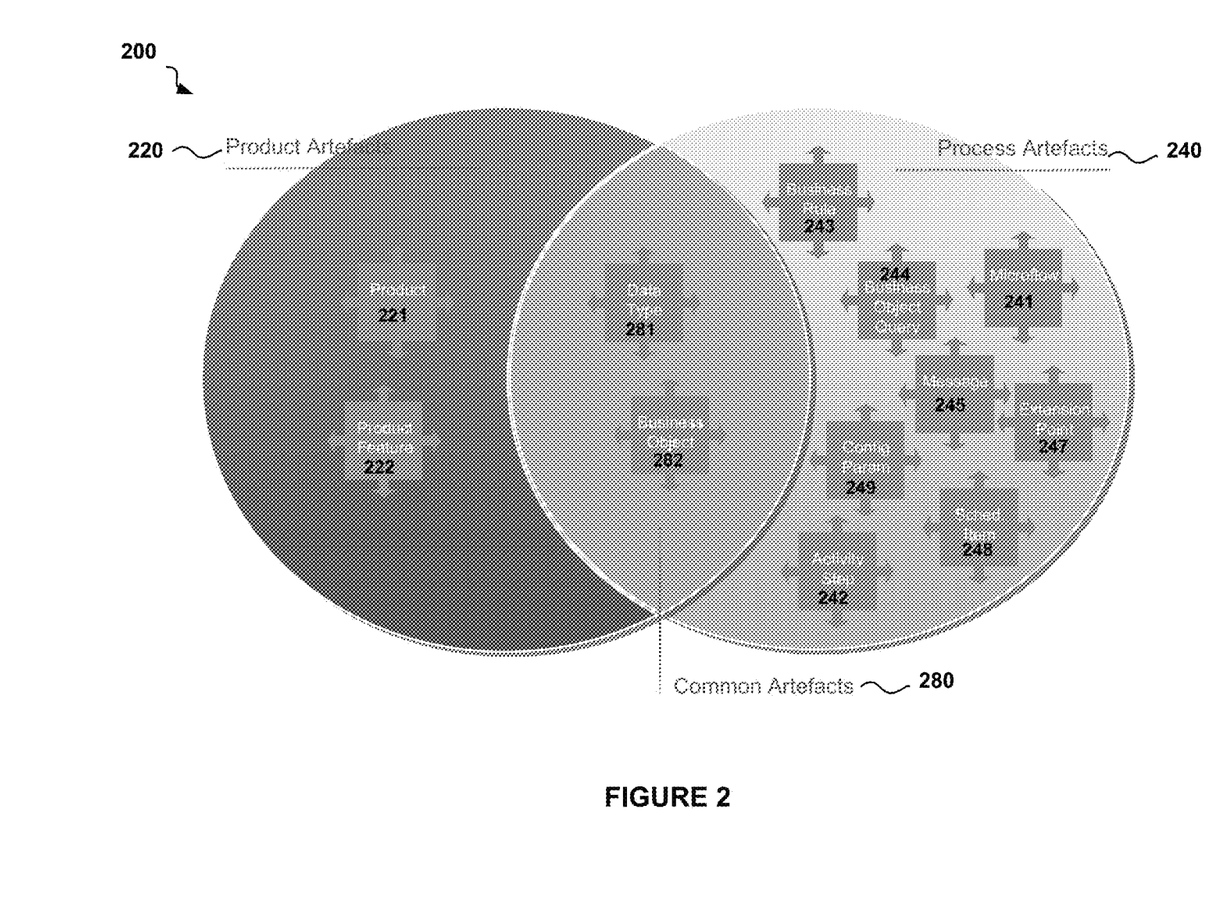
FIG. 2 illustrates a conceptual view of an embodiment of various types and categories of artefacts.

FIG. 2 illustrates a conceptual view of an embodiment of various types and categories of artefacts 200, which can include product artefacts 220, process artefacts 240 and artefacts 280 common to products and processes. In an embodiment, artefacts can exist in multiple versions and multiple instances having different contextual parameters. Microflows 241, activity steps 242 and business rules 243 have been described in detail above. In one embodiment, process artefacts 240 could additionally include:

Business object queries 244: These are the pre-defined rules for manipulating the data defined as part of a business object (described below). In systems using relational databases, business object queries could be defined as SQL queries.

Message 245: These describe the data structures that are required to be sent to and received from external systems, including human operated ones. They can be reused across any number of microflow instances.

Extension point 247: In order to enable application development teams to extend the scope and range of the base functionality provided, certain points in the execution flow can be designated where extensions (e.g. external program modules) can be inserted. These points can be defined along with any implementations of such extended behavior Schedulable item 248: Certain parts of an application require that elements of their functionality are to execute at a designated future point in time, such as on the maturity date of a fixed deposit. Such elements are called schedulable items and are a form of extension point specifically related to time.

Configuration parameters 249: These describe the possible variations in execution of the system.

In one embodiment, product artefacts 220 could include:

Products 221: These describe the collective behavior of any given financial entity that tends to be sold by financial institutions to their customers, such as savings accounts, loan accounts and fixed deposit accounts.

Product features 222: These describe specific behavior required in the context of an instance of a product 221

(say, an account) being operated upon, such as a transaction being passed across it, or a product 221 instance being created or closed. They are composed with other features to form a product definition 221 and are reusable across any number of product instances 221.

In one embodiment, common artefacts 280 comprise a set of artefacts that can be used by process artefacts 240 or product artefacts 220. Common artefacts 280 could include:

Data types 281: These describe the fundamental data structures that are used across the various artefact types. They can be simple data structures such as a date, or complex ones that comprise more elaborate entities, such as a customer. Data types 181 can be reused across any number of artefact types and their instances.

Business objects 282: These describe the long-term storage behavior required in specific business scenarios. Business objects 282 can be reused across any number of microflow and product instances.

The above artefact types are purely exemplary, and not limiting. Additional artefacts could be defined to expand the range of application functionality that is required in a application.

Figure 3:
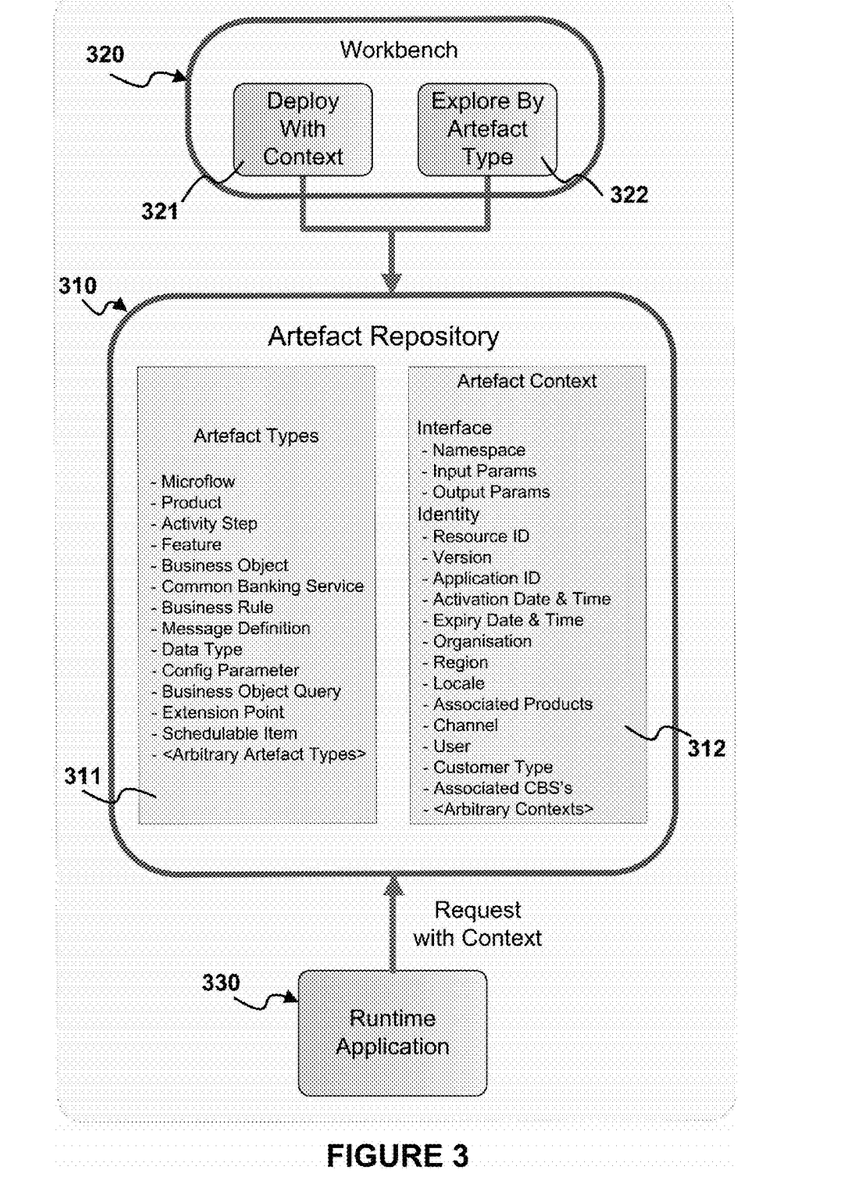
FIG. 3 shows a conceptual view of one embodiment of how artefacts and their respective contextual parameters can be stored on an artefact repository residing on computer-readable media.

As shown in FIG. 3, artefact types 311 and their respective artefact contexts 312 are stored on an artefact repository residing on computer-readable media. In one embodiment, the system provides a workbench 320 that allows application developers to explore artefacts by type 322 and to deploy 321 applications comprising artefact types 311 with their corresponding artefact contexts 312.

Such artefact contexts 312 can include: resource identifier, version identifier, application identifier, activation date and time, expiration date and time, organization identifier, geographical region, locale, associated products, delivery channel, user types and customer type. In an embodiment, artefact types 311 and their associated artefact contexts 312 are stored in an artefact repository 310 that recognizes its executing environment and retrieves the correct version of a requested artefact for the system to execute.

The above artefact contexts 312 are purely exemplary, and not limiting. Additional artefacts could be defined to expand the range of application functionality that is required in a application.

In one embodiment, a process flow can be comprised of activity step logical artefacts, business rule logical artefacts and other sub-flows, as defined at design time. At run-time, these logical artefacts are resolved to physical artefacts based on the contextual parameters of the physical artefacts.

In one embodiment, if the purpose of an activity step artefact is to determine customer eligibility information that might vary according to the country (locale) the application is operating in, the appropriate activity step artefact is substituted dynamically with an activity step artefact 242 appropriate to the executing country. Another example might be for a product artefact 220 to be deployed into a system where it only becomes active at a certain date in the future, perhaps according to market requirements, following which it may expire at another future date.

Figure 4:
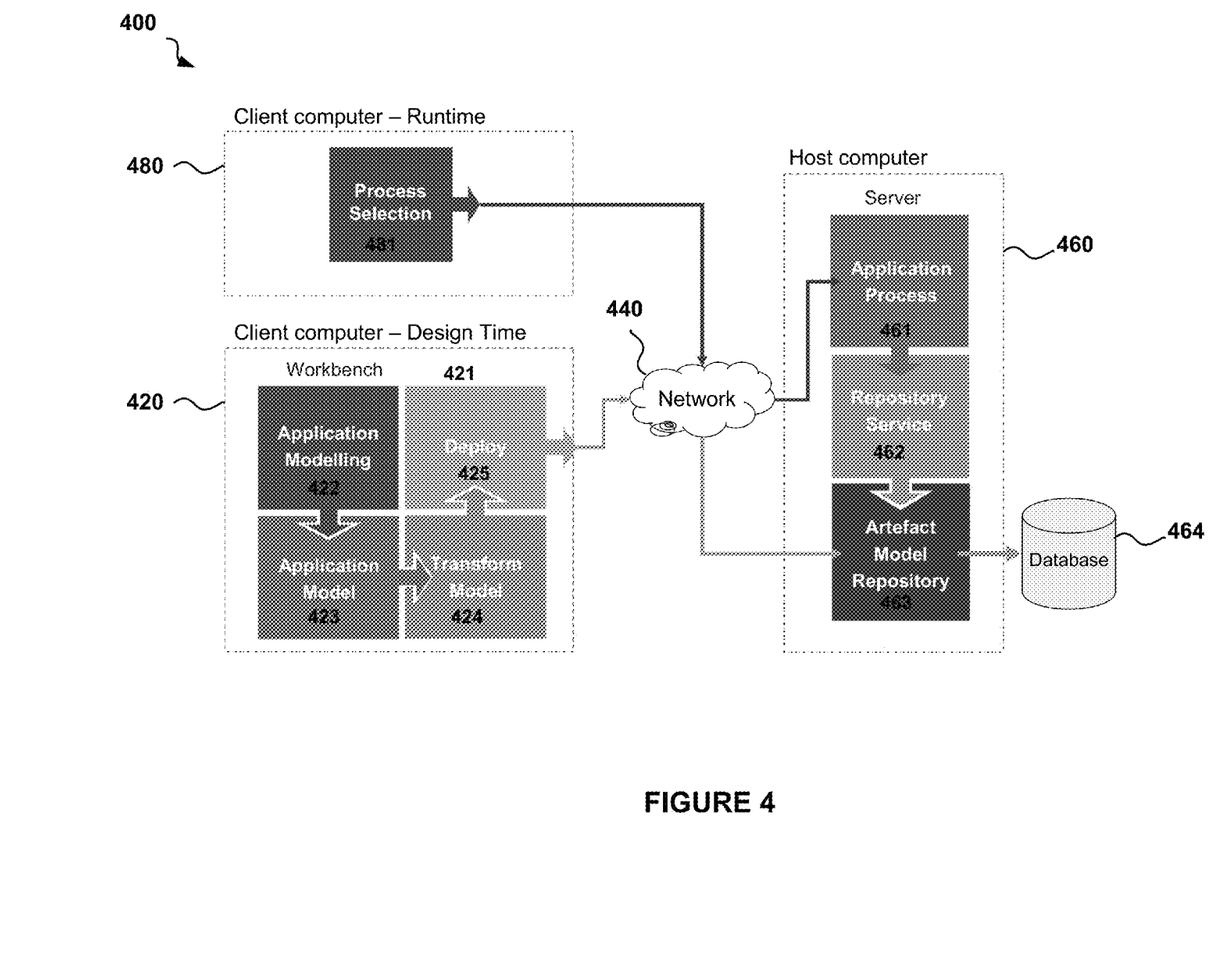
FIG. 4 illustrates an embodiment of a high-level view of a system for developing and running applications utilizing artefacts.

FIG. 4 illustrates an embodiment of a high-level view of a system 400 for developing and running applications utilizing artefacts. In an embodiment, the system provides a workbench 421 on client computers 420 that enables developers to design and develop applications that use artefacts. In an embodiment, the workbench 421 provides tools for application modeling 422. The application modeling tools 422 allow developers to browse, edit and revise existing artefacts and application models 423 and create new artefacts and application models.

In an embodiment, the workbench 421 retrieves data relating to existing artefacts and application models 423 over a network 440 from an artefact and model repository 463 stored on a database 464 accessible to the server 460. In an embodiment, the workbench 421 can additionally or alternatively store data relating to existing artefacts and application models 423 stored on computer-readable media, locally accessible to the client computer 420.

When creation or revision of an artefact or application model 423 is complete, the workbench transforms 424 the artefact or application model into a form that is executable at run-time and is suitable for storage on the artefact and artefact model repository 463 and deploys 425 the transformed artefact 424 or application model over the network 440 to the server 460.

In an embodiment, when an end user wishes to run an artefact based application process 461, the user can select the process 481 via a client computer 480 connected to the server 460 via the network 440. In response, the server 460 initiates an instance of the application process 461 on the server 460, which is in communication with the client computer 480 via the network 440. The application process 461 accesses data relating to application models and artefacts from the artefact model repository 463 via a repository service 462 hosted by the server 460.

Figure 5:
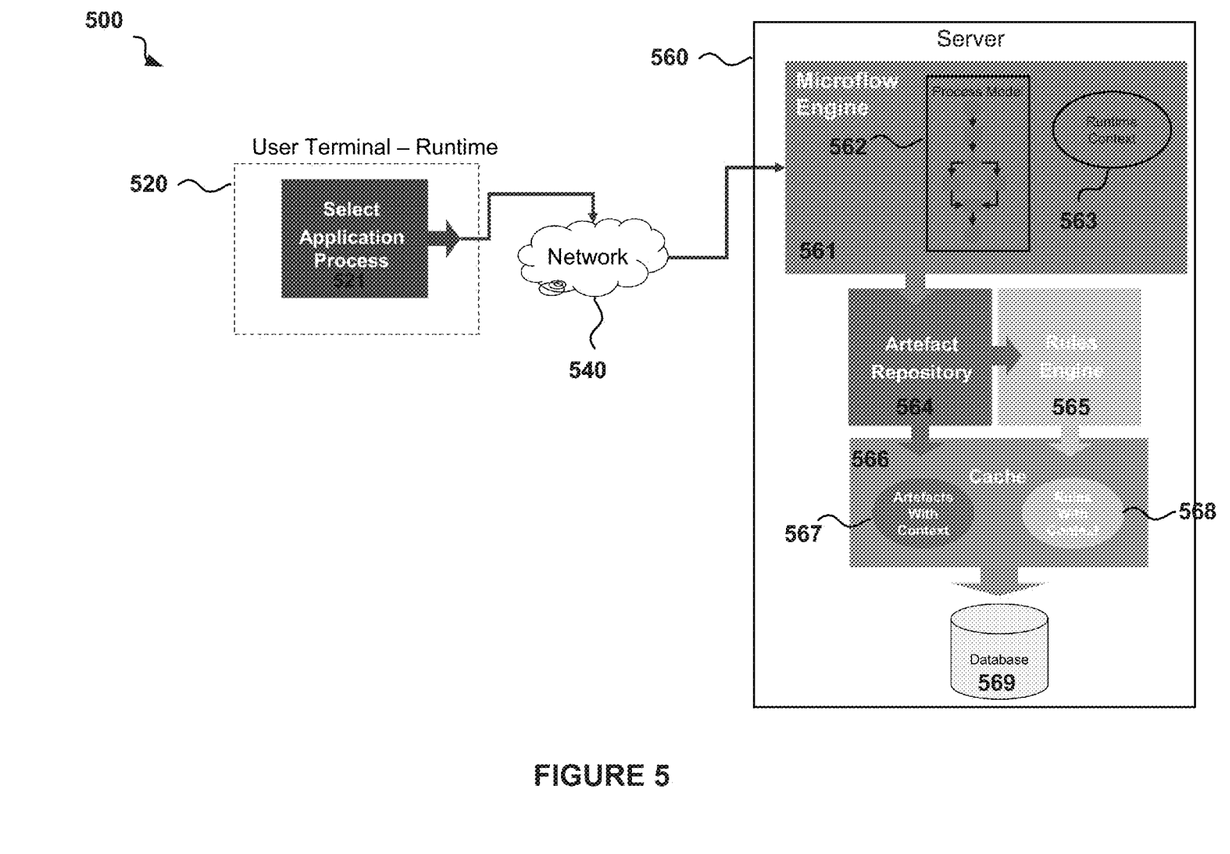
FIG. 5 illustrates an embodiment of a more detailed view of a system for running an artefact-based application process.

FIG. 5 illustrates an embodiment of a more detailed view of a system 500 for running an artefact based application process. As in FIG. 4, an artefact based application process is initiated when a user selects an application process 521 from a user terminal 520 over a network 540. The selection of the application process 521 causes a microflow engine 561 hosted on the server 560 to execute an instance of a process model 562 using a run-time context 563 received from the user terminal 520.

The process model 562 and its component artefacts are retrieved from the artefact repository 564 and are executed by the microflow engine 561. The artefact repository 564 includes a rules engine 565 that retrieves and processes application rules applicable to the run-time context. Application rules are a type of artefact that can be deployed to the run-time repository. In one embodiment, application rules can include core rules provided by the base system which are always available and are applicable to all artefact types. For example: "Do not use an artefact until its activation date is reached" could be one core rule.

Additionally, in one embodiment, application rules could also include extension rules. Application developers and system customizers may define and deploy extension rules that have a user customizable scope. For example a rule could be applied only to artefacts belonging to a specific application or of a specific artifact type. In one embodiment an extension rule could be provided by a Java class, in another embodiment by an interface into a 3rd party rules engine.

In one embodiment, the core rules are used to select the set of extension rules applicable to a run-time context. In one embodiment, the combination of the core rules and extension rules are used to select other artefact instances applicable to the run-time context that should be retrieved and executed.

In one embodiment, artefacts, with their corresponding contextual parameters 567, and rules, with their corresponding contextual parameters 568, are accessed by the artefact repository 564 from a cache 566. The system stages data relating to artefacts 567 and rules 568 from persistent storage, such as a database 569, to the cache 566 on an as-needed basis.

Figure 6:
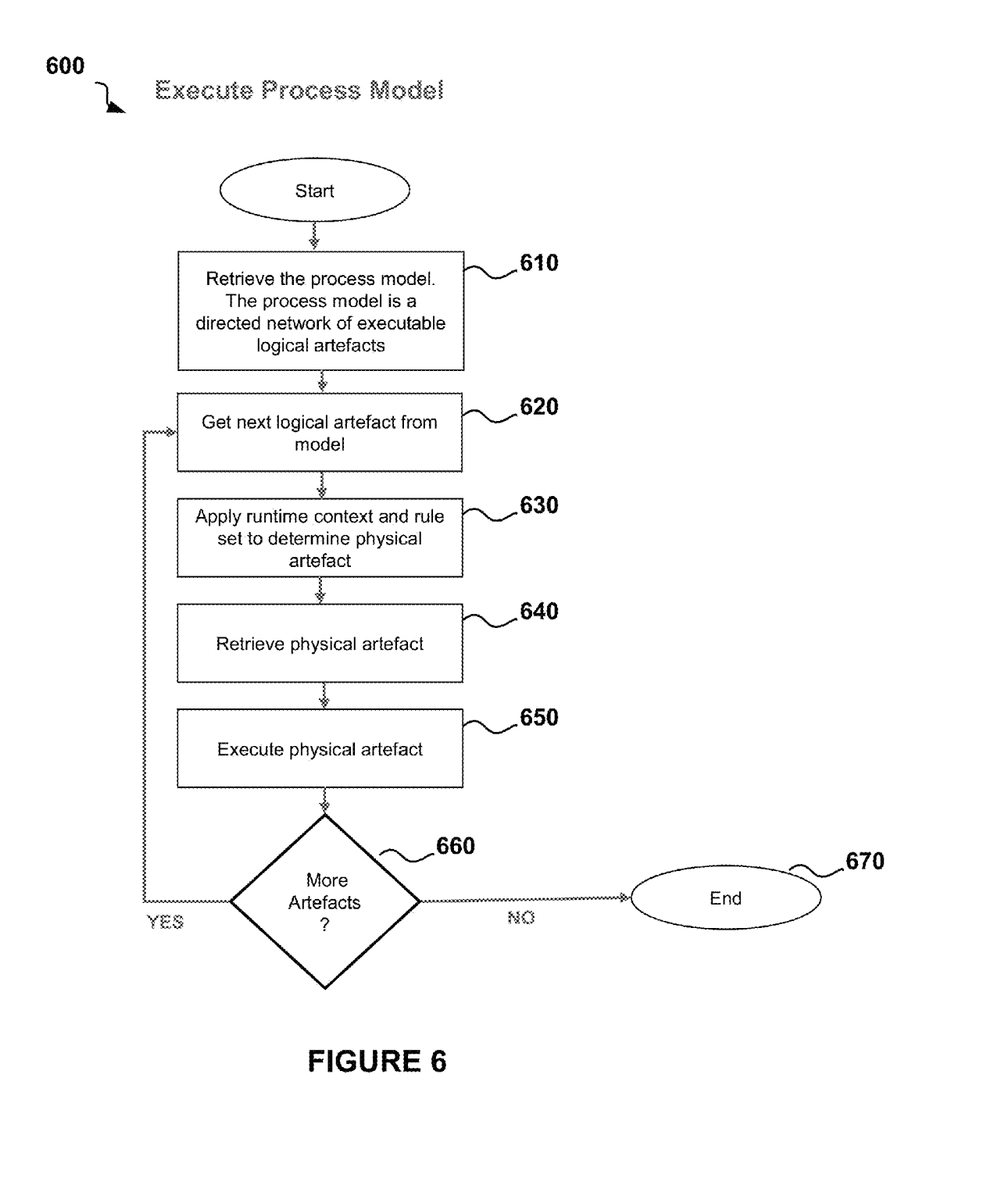
FIG. 6 is a flowchart illustrating an embodiment of a high-level view of a method for the execution of a process model.

FIG. 6 is a flowchart 600 illustrating an embodiment of a high-level view of a method for the execution of a process model. In block 610 of the method, a process model is retrieved from a repository. In an embodiment, the process model is a directed network of executable logical artefacts. In block 620 of the method, the next logical artefact in the model is retrieved. In block 630 of the method, a run-time context and an application rule set associated with the run-time context is applied to the logical artefact to determine a physical artefact (e.g., a unique resource ID and version stored by the repository) that should be used. In block 640 of the method, the physical artefact is retrieved. In block 650 of the method, the physical artefact is executed. If there are more artefacts 660, the method loops back to block 620 of the method, otherwise, the method ends 670.

Figure 7:
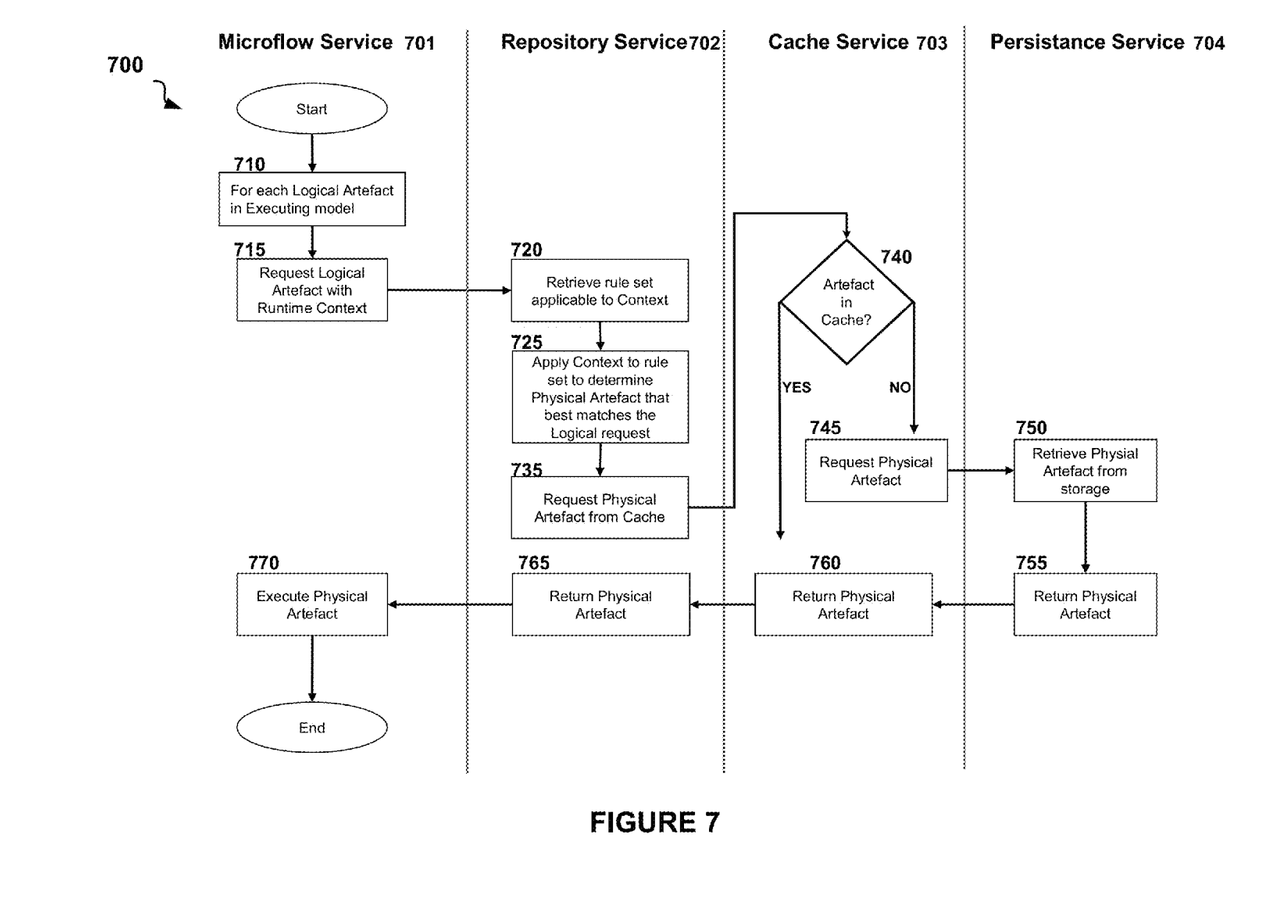
FIG. 7 is a flowchart illustrating an embodiment of a more detailed view of a method for the execution of a process model.

FIG. 7 is a flowchart 700 illustrating an embodiment of a more detailed view 600 of a method for the execution of a process model. In one embodiment, the method shown in FIG. 7 corresponds to blocks 620 through 650 of the method shown in FIG. 6. In the illustrated embodiment, the blocks of the method are executed by one of a microflow service 701, a repository service 702, a cache service 703, or a persistence service 704.

In one embodiment, the microflow service 701 is provided by a microflow engine such as shown in 561 of FIG. 5. In one embodiment, the repository service 702 is provided by an artefact repository such as shown in 564 of FIG. 5. In one embodiment, the cache service 703 is provided by a cache such as shown in 566 of FIG. 5. In one embodiment, the persistence service 704 is provided by a database such as shown in 569 of FIG. 5.

The blocks 715 to 770 of the method illustrated in FIG. 7 are performed for each logical artefact 710 in an executing process model. In block 715, the microflow service 701 requests a logical artefact from the repository service 702. The request includes a run-time context.

In block 720 of the method, the repository service 702 retrieves a rule set applicable to the run-time context. In block 725 of the method, the repository service applies the run-time context to the rule set to determine a physical artefact that best matches the request. In block 735 of the method, the repository service then requests the physical artefact from the cache service 703.

If the physical artefact is in cache 740 (YES), in block 760 of the method, the cache service 703 returns the physical object to the repository service 702. If the physical artefact is not in cache 740 (NO), in block 745 of the method, the cache service 703 requests a copy of the physical artefact from the persistence service 704. In block 750 of the method, the persistence service 704 retrieves a copy of the physical artefact from storage. In block 755 of the method, the persistence service 704 returns the physical artefact to the cache service 703, which then in turn returns 760 a copy of the physical artefact to the repository service 702.

In block 765 of the method, the repository service 702 returns a copy of the physical artefact to the microflow service 701, which in turn, executes it 770.

An Illustrative Example

In an illustrative example of how one embodiment of the disclosed system and method could be used by a bank, suppose:

the bank has an artefact-based application system installed supporting branches in the U.S. and Europe;
there is a core process "Open Customer Account" that must behave differently in the U.S. and in Europe;
Europe is handled by the core system, but U.S. branches need localization changes;
if the customer is taken on by the head office in the U.S., some additional activities must be undertaken;
during the life of the system, U.S. authorities introduce new mandatory tasks to be carried out when opening a customer account that will become effective at a predetermined date of Jan. 5, 2011;
changes are be deployed to the system before Jan. 5, 2011, but do not become active until Jan. 5, 2011;
the regulations allow for customers who are in the middle of being taken on to be completed under the old rules.

Figure 8:
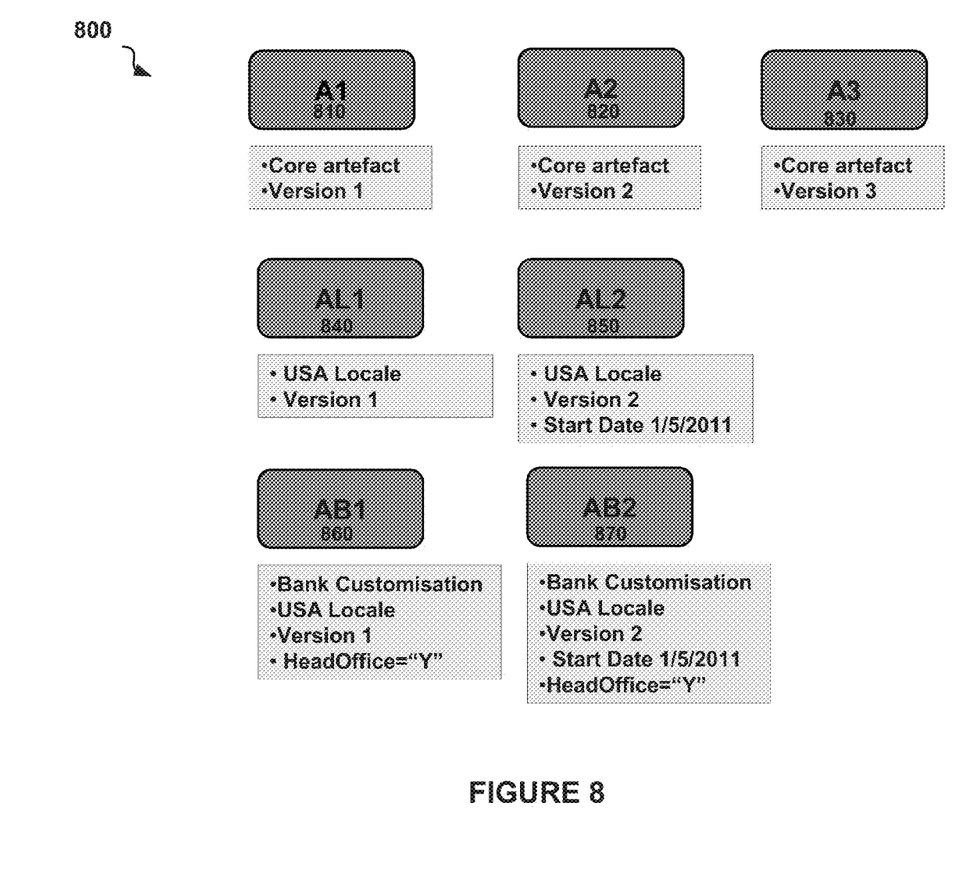
FIG. 8 illustrates a set of "Open Customer Account" artefacts of one embodiment, which could be implemented using the disclosed systems and methods.

FIG. 8 illustrates a set of "Open Customer Account" artefacts 800 which could be implemented in the above scenario. The darkly shaded boxes 810-870 represent alternative implementations of the process "OpenCustomerAccount". The lightly shaded boxes show the artefact context data associated with each instance.

An application development organization located in Europe releases a first version, A1 810, of the core process;
The application development organization releases a second version, A2 820, of the core process to fix a bug;
A U.S. partner of the application development organization then releases a version, AL1 840, of the process A1 810 that is specifically tailored for the North American market;
The application development organization releases a third version, A3 830, of the core process, which adds additional functionality;
The bank's IT department customizes version AL1 840 to create a new version, AB1 860, to add some bank-specific processing, which is used only if the transaction is booked through the head office;
The U.S. partner of the application development organization updates their localized process, AL1 840, to create a process, AL2 850, to take account of changes in U.S. regulations that do not come into effect until Jan. 5, 2011;
The bank's IT department makes the changes necessary to their customized process, AB1 860, to create a new version, AB2 870, that supports the U.S. regulations.

Figure 9:
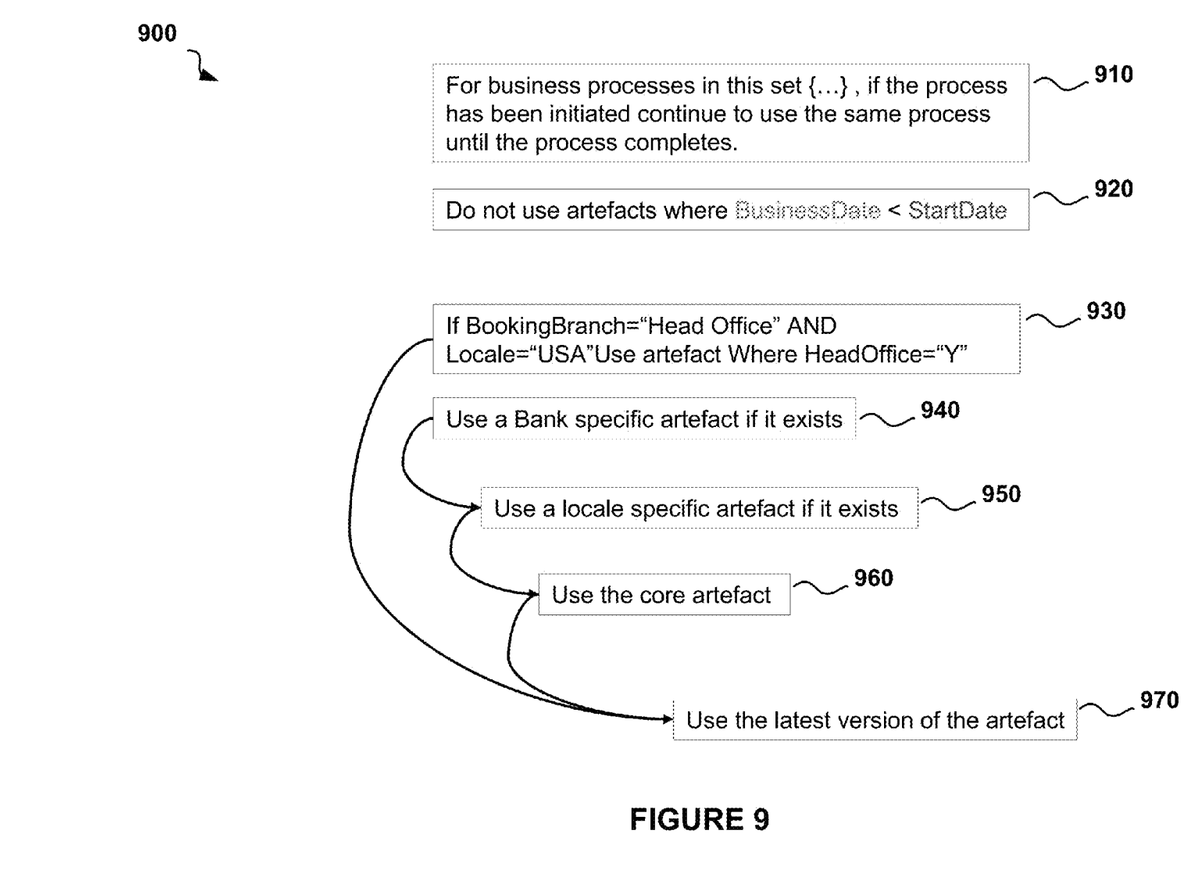
FIG. 9 illustrates a set of application rules that in one embodiment could be implemented using the disclosed systems and methods.

FIG. 9 illustrates a set of application rules that could be implemented in the above scenario. Rule 910 provides that executing business processes use the same process (e.g., physical artefact or process model) until the processes complete. As processes can be long running, while they are in-flight, a new version of the process could be deployed. In some cases it is desirable to NOT use the new version for in-flight processes. In this case, newly started processes will immediately use the new version.

Rule 920 provides that artefacts whose start-date attribute is greater than the business date (e.g., the date the process was initiated) are not used. This allows time sensitive processes to be deployed ahead of time and prevents them being used until they are needed.

Rule 930 provides that if the bank branch booking the transaction is the "Head Office" in the locale="USA", artefacts having a context variable of HeadOffice="Y" (e.g. versions AB1 or AB2 of FIG. 8) should be used. This is a custom, bank-specific rule, which has been specifically created for a single location. All the other rules in FIG. 9 are standard rules provided by the system. This allows the bank to apply its specific customizations to the system in specific circumstances. If this rule is matched, rules 940-960 are not evaluated.

Rule 940 provides that if a bank-specific artefact exists, it should be used. Rule 950 provides that if a locale-specific artefact applicable to the current run-time context exists (e.g., AL1 or AL2 of FIG. 8), it should be used. Rule 960 provides that if no other rules apply, the core version of an artefact (e.g., A1, A2 or A3 of FIG. 8) should be used. Thus, Rules 930-960 work together to select the most specific process available in a given run-time context.

Finally, rule 970 provides that the latest version of artefacts should be used, subject to the provisions of rule 920.

Examples of the execution of the above rules is as follows.

Scenario 1: A new account is opened in the U.S. head office (HeadOffice="Y") before new regulations come into effect (business date<Start Date of Jan. 5, 2011). Artefact AB1 is selected.

Scenario 2: A new account is opened in the U.S. head office (HeadOffice="Y") before new regulations come into effect (business date<Start Date of Jan. 5, 2011). The process takes several days spanning Jan. 5, 2011. Artefact AB1 is selected and the process runs to completion using AB1.

Scenario 3: A new account is opened after Jan. 5, 2011 in the U.S., but not in the head office. Artefact AL2 is selected.

Scenario 4: A new account is opened in Europe. Artefact A3 is selected.

Figure 10:
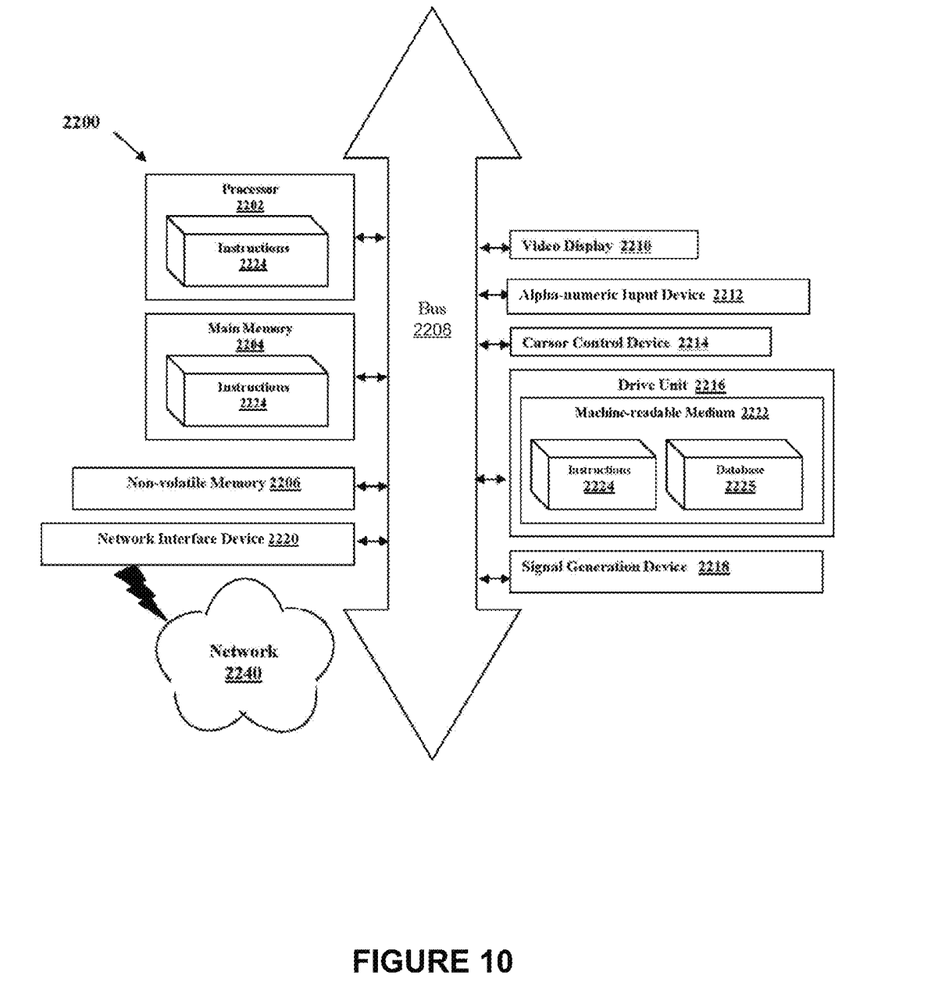
FIG. 10 is a diagrammatic representation of an embodiment of a machine within which a set of instructions for causing the machine to perform one or more of the methodologies discussed herein may be executed.

FIG. 10 is a diagrammatic representation of an embodiment of a machine 2200, within which a set of instructions for causing the machine to perform one or more of the methodologies discussed herein may be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

In one embodiment, the machine 2200 is the server 460 of FIG. 4 according to an embodiment as described herein. In one embodiment, the machine 2200 is a component of the server 460 of FIG. 4, such as one or more computers within the server 460 of FIG. 4. In one embodiment, the machine 2200 is the client computer 420 and/or 480 of FIG. 4 according to an embodiment as described herein.

The machine 2200 includes a processor 2202 (e.g., a central processing unit (CPU), a graphics processing unit (GPU), or both), a main memory 2204 and a nonvolatile memory 2206, which communicate with each other via a bus 2208. In some embodiments, the machine 2200 may be a desktop computer, a laptop computer, personal digital assistant (PDA), or mobile phone, for example. In one embodiment, the machine 2200 also includes a video display 2210, an alphanumeric input device 2212 (e.g., a keyboard), a cursor control device 2214 (e.g., a mouse), a drive unit 2216, a signal generation device 2218 (e.g., a speaker) and a network interface device 2220.

In one embodiment, the video display 2210 includes a touch sensitive screen for user input. In one embodiment, the touch sensitive screen is used instead of a keyboard and mouse. The disk drive unit 2216 includes a machine-readable medium 2222 on which is stored one or more sets of instructions 2224 (e.g., software) embodying any one or more of the methodologies or functions described herein. The instructions 2224 may also reside, completely or at least partially, within the main memory 2204 and/or within the processor 2202 during execution thereof by the computer system 2200, the main memory 2204 and the processor 2202 also including machine-readable media. The instructions 2224 may further be transmitted or received over a network 2240 via the network interface device 2220. In some embodiments, the machine-readable medium 2222 also includes a database 2225.

While the machine-readable medium 2222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

In general, the routines executed to implement the embodiments of the disclosure may be implemented as part of an operating system or a specific application, component, program, object, module or sequence of instructions referred to as "programs". For example, one or more programs may be used to execute specific processes described herein. The programs typically comprise one or more instructions set at various times in various memory and storage devices in the machine and that, when read and executed by one or more processors, cause the machine to perform operations to execute elements involving the various aspects of the disclosure.

Moreover, while embodiments have been described fully in the context of machines, those skilled in the art will appreciate that the various embodiments are capable of being distributed as a program product in a variety of forms, and that the disclosure applies equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
  performing, via a computing device, a microflow service comprising:
    receiving a request to execute a computer-implemented business process, the request comprising a run-time context;
    retrieving a process model corresponding to the computer-implemented business process, the process model comprising a plurality of logical artefacts; and
    for each logical artefact of the plurality of logical artefacts, sending a first request for a physical artefact to a repository service, the first request comprising an identification of the logical artefact and the run-time context;

receiving the physical artefact from the repository service; and executing the physical artefact; and performing, via the computing device, a repository service comprising:

receiving the first request for the physical artefact from the microflow service;

retrieving a rule set applicable to the run-time context, wherein the run-time context comprises a run-time context parameter and at least one rule in the rule set relates to the run-time context parameter such that the at least one rule identifies physical artefacts having an artefact context parameter whose value relates to the run-time context parameter;

identifying the physical artefact using the rule set and the run-time context;

sending a second request for the physical artefact to a cache service, the second request comprising an identification of the physical artefact;

receiving the physical artefact from the cache service; and returning the physical artefact to the microflow service.

2. The method of claim 1 wherein the run-time context parameter comprises a location, wherein the at least one rule identifies physical artefacts having an artefact context parameter that relates to the location.

3. The method of claim 1 wherein the run-time context parameter comprises a run-time date and time, wherein the at least one rule identifies physical artefacts having an activation date and time that is not greater than the run-time date and time and an expiration date and time that is not less than the run-time date and time.

4. The method of claim 1 wherein a rule in the rule set further specifies that a most recent version of each physical artefact is to be identified and retrieved.

5. The method of claim 1 wherein if a new version of a physical artefact is created that matches the run-time context and the rule set, the new version of the physical artefact is retrieved and executed.

6. The method of claim 1 wherein a rule in the rule set further specifies that only if the execution of a physical artefact has been initiated, the execution of the physical artefact should continue to completion, and a new version of the artefact will not be retrieved and executed.

7. The method of claim 1 wherein the rule set is created by a first entity, the method further comprising:

receiving, via the computing device, from a second entity, at least one rule that is not present in the rule set;

adding, via the computing device, the at least one rule to the rule set.

8. The method of claim 1 wherein the rule set is created by a first entity, the method further comprising:

receiving, via the computing device, from a second entity, a modification to at least one rule that is present in the rule set;

modifying, via the computing device, the at least one rule such that the at least one rule reflects the modification.

9. A system comprising a processor;

a storage medium for tangibly storing thereon program logic for execution by the processor, the program logic comprising:

logic executed by the processor for a microflow service, wherein the microflow service is configured to:

receive a request from a user to execute a computer-implemented business process, the request comprising a run-time context;

retrieve a process model corresponding to the computer-implemented business process, the process model comprising a plurality of logical artefacts;

for each logical artefact of the plurality of logical artefacts, send a first request for a physical artefact to a repository service, the request comprising an identification of the logical artefact and the run-time context;

receive the physical artefact from the repository service; and execute the physical artefact; and logic executed by the processor for the repository service, wherein the repository service is configured to:

receive the first request for the physical artefact from the microflow service;

retrieve a rule set applicable to the run-time context, wherein the run-time context comprises a run-time context parameter and at least one rule in the rule set relates to the run-time context parameter such that the at least one rule identifies physical artefacts having an artefact context parameter whose value relates to the run-time context parameter;

identify the physical artefact using the rule set and the run-time context;

send a second request for the physical artefact to a cache service, the request comprising an identification of the physical artefact;

receive the physical artefact from the cache service; and return the physical artefact to the microflow service.

10. The system of claim 9 wherein the run-time context parameter comprises a location, wherein the at least one rule identifies physical artefacts having an artefact context parameter that relates to the location.

11. The system of claim 9 wherein the run-time context parameter comprises a run-time date and time, wherein the at least one rule identifies physical artefacts having an activation date and time that is not greater than the run-time date and time and an expiration date and time that is not less than the run-time date and time.

12. The system of claim 9 wherein a most recent version of each physical artefact is identified and retrieved.

13. The system of claim 9 further comprising:

logic executed by the processor for a cache service, wherein the cache service is configured to:

receive the second request for the physical artefact from the repository service, determine if the physical artefact is in a cache implemented on computer-readable media accessible to the processor, if the physical artefact is in the cache, return the physical artefact to the repository service, if the physical artefact is not in the cache, send a third request for the physical artefact to a persistence service, the third request comprising an identification of the physical artefact, receive the physical artefact from the persistence service, store the physical artefact in the cache, and return the physical artefact to the repository service.

14. The system of claim 13 wherein the cache service is configured to purge physical artefacts from the cache if the artefacts are not requested within a predetermined time interval.

15. The system of claim 13 further comprising:
logic executed by the processor for a persistence service, wherein the persistence service is configured to:
receive the third request for the physical artefact from the cache service;
retrieve the physical artefact from a persistent storage device accessible to the processor;
return the physical artefact to the cache service.

16. The system of claim 13 further comprising:
wherein the repository service is further configured to:
receive, from a second entity, a first at least one rule that is not present in the rule set;
add the first at least one rule to the rule set;
receive, from the second entity, a modification to a second at least one rule that is present in the rule set; and
modify the second at least one rule such that the second at least one rule reflects the modification.

17. A non-transitory machine-readable medium that provides instructions for a processor, which when executed by the processor cause the processor to perform a method comprising:
performing a mircroflow service comprising:
receiving a request to execute a computer-implemented business process, the request comprising a run-time context;
retrieving a process model corresponding to the computer-implemented business process, the process model comprising a plurality of logical artefacts;
for each logical artefact of the plurality of logical artefacts, sending a first request for a physical artefact to a repository service, the request comprising an identification of the logical artefact and the run-time context;
receiving the physical artefact from the repository service; and
executing the physical artefact; and
performing a repository service comprising:
receiving the first request for the physical artefact from the microflow service;
retrieving a rule set applicable to the run-time context, wherein the run-time context comprises a run-time context parameter and at least one rule in the rule set relates to the run-time context parameter such that the at least one rule identifies physical artefacts having an artefact context parameter whose value relates to the run-time context parameter;
identifying the physical artefact using the rule set and the run-time context;
sending a second request for the physical artefact to a cache service, the second request comprising an identification of the physical artefact;
receiving the physical artefact from the cache service; and
returning the physical artefact to the microflow service.

18. The non-transitory machine-readable medium of claim 17 wherein the run-time context parameter comprises a location, wherein the at least one rule identifies physical artefacts having an artefact context parameter that relates to the location.

19. The non-transitory machine-readable medium of claim 17 wherein the run-time context parameter comprises a run-time date and time, wherein the at least one rule identifies physical artefacts having an activation date and time that is not greater than the run-time date and time and an expiration date and time that is not less than the run-time date and time.

20. The non-transitory machine-readable medium of claim 17 wherein a most recent version of each physical artefact is identified and retrieved.

\* \* \* \* \*